(12) United States Patent
Xiao et al.

(10) Patent No.: US 10,252,224 B2
(45) Date of Patent: Apr. 9, 2019

(54) HYDROPHOBIC-OLEOPHILIC HOLLOW FIBER COMPOSITE MEMBRANE AND PREPARING METHOD THEREOF

(71) Applicant: Tianjin Polytechnic University, Tianjin (CN)

(72) Inventors: Changfa Xiao, Tianjin (CN); Junqiang Hao, Tianjin (CN); Jian Zhao, Tianjin (CN); Hailiang Liu, Tianjin (CN); Qinglin Huang, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 246 days.

(21) Appl. No.: 15/113,256

(22) PCT Filed: Oct. 29, 2015

(86) PCT No.: PCT/CN2015/093148
§ 371 (c)(1),
(2) Date: Jul. 21, 2016

(87) PCT Pub. No.: WO2017/020436
PCT Pub. Date: Feb. 9, 2017

(65) Prior Publication Data
US 2017/0232402 A1    Aug. 17, 2017

(30) Foreign Application Priority Data

Aug. 4, 2015  (CN) .......................... 2015 1 0470419

(51) Int. Cl.
| | | |
|---|---|---|
| *B01D 71/34* | (2006.01) | |
| *B01D 71/82* | (2006.01) | |
| *C02F 1/44* | (2006.01) | |
| *B01D 69/08* | (2006.01) | |
| *B01D 67/00* | (2006.01) | |
| *B01D 69/12* | (2006.01) | |
| *C02F 101/32* | (2006.01) | |

(52) U.S. Cl.
CPC .......... *B01D 71/34* (2013.01); *B01D 67/0011* (2013.01); *B01D 69/08* (2013.01); *B01D 69/081* (2013.01); *B01D 69/12* (2013.01); *B01D 71/82* (2013.01); *C02F 1/44* (2013.01); *C02F 1/444* (2013.01); *B01D 2323/18* (2013.01); *B01D 2323/40* (2013.01); *B01D 2325/04* (2013.01); *B01D 2325/38* (2013.01); *C02F 2101/32* (2013.01)

(58) Field of Classification Search
CPC ...... B01D 71/34; B01D 71/82; B01D 69/081; B01D 67/0011; B01D 69/08; B01D 69/12; B01D 2323/18; B01D 2325/04; B01D 2325/38; B01D 2323/40; C02F 1/444; C02F 1/44; C02F 2101/32
See application file for complete search history.

(56) References Cited

U.S. PATENT DOCUMENTS

| | | | | |
|---|---|---|---|---|
| 8,393,479 | B2 * | 3/2013 | Kamleiter | B01D 63/06 210/482 |
| 9,533,266 | B2 * | 1/2017 | Xiao | B01D 69/08 |
| 9,718,967 | B2 * | 8/2017 | Malshe | C10M 171/06 |
| 2003/0194547 | A1 * | 10/2003 | Fuhrmann | B01D 69/10 428/304.4 |
| 2005/0142280 | A1 * | 6/2005 | Kim | B01D 67/0018 427/2.1 |
| 2007/0007197 | A1 * | 1/2007 | Mahendran | B01D 67/0018 210/500.36 |
| 2008/0251445 | A1 * | 10/2008 | Kamleiter | B01D 63/06 210/497.01 |

FOREIGN PATENT DOCUMENTS

| | | |
|---|---|---|
| CN | 1884322 | 12/2006 |
| CN | 103601826 | 2/2014 |

OTHER PUBLICATIONS

Ayman M. Atta et al., "Swelling and Network Parameters of High Oil-Absorptive Network Based on 1-Octene and Isodecyl Acrylate Copolymers", Journal of Applied Polymer Science, vol. 97, pp. 80-91 (2005); DOI 10.1002/app.21735; Published online in Wiley InterScience (www.interscience.wiley.com).

Xiao Ma et al., "Research on property of absorptive functional fiber based on polymethacrylate prepared via reactive extrusion and melt-spinning", Journal of Functional Materials, 2013, 2, pp. 177-181; 1994-2016 China Academic Journal Electronic Publishing House, http://www.cnki.net.

Dao-an Zha et al., "Superhydrophobic polyvinylidene fluoride/ graphene porous materials", Carbon, 2011,49: pp. 5166-5172; Available at www.sciencedirect.com, journal homepage: www.elsevier. com/locate/carbon.

Duc Dung Nguyen et al., "Superhydrophobic and superoleophilic properties of graphene-based sponges fabricated using a facile dip coating method", Energy & Environmental Science, 2012, 5: pp. 7908-7912; DOI: 10.1039/c2ee21848h; www.rsc.org/ees.

Zhiqiang Niu et al., "A Leavening Strategy to Prepare Reduced Graphene Oxide Foams", Advanced Materials, 2012, 24: pp. 4144-4150; DOI: 10.1002/adma.201200197; www.MaterialsViews.com.

(Continued)

*Primary Examiner* — Pamela H Weiss
(74) *Attorney, Agent, or Firm* — Hauptman Ham, LLP

(57) ABSTRACT

The present invention discloses a hydrophobic-oleophilic and hollow fiber composite membrane and preparing method thereof. A preparing method includes preparing hollow tubular braids by two-dimensional braided technique using polyester filaments, wherein the hollow tubular braids are used as the reinforcements. The method further includes mixing polyvinylidene fluoride, hydrophobic pore-forming agent, and the rest of solvent to prepare a casting solution of surface separation layer. The method further includes pretreatment processing of the reinforcements; and coating the casting solution of surface separation layer on the outer surface of the processed reinforcements through a spinning spinneret to form a primary membrane. The reinforcements are replaced by the primary after post-processing, and repeating the coating process.

8 Claims, No Drawings

(56) References Cited

OTHER PUBLICATIONS

Lei Wang et al., "Surface Hydrophilicity and Structure of Hydrophilic Modi!ed PVDF Membrane by Nonsolvent Induced Phase Separation and Their Effect on Oil/Water Separation Performance", Industrial & Engineering Chemistry Research, dx.doi.org/10.1021/ie4042388; Ind. Eng. Chem. Res. 2014, 53: pp. 6401-6408.

* cited by examiner

HYDROPHOBIC-OLEOPHILIC HOLLOW FIBER COMPOSITE MEMBRANE AND PREPARING METHOD THEREOF

RELATED APPLICATIONS

The present application is a National Phase of International Application Number PCT/CN2015/093148, filed Oct. 29, 2015, and claims the priority of China Application No. 2015104704198, filed Aug. 4, 2015, which are incorporated herein by reference in their entireties.

BACKGROUND OF THE INVENTION

Technical Field

The present invention relates to a technical field of membrane, and more particularly to a hydrophobic-oleophilic hollow fiber composite membrane and a preparation method thereof.

Description of Related Arts

With the development of society and industrialization advancement speeding up, the water environment pollution caused by the direct discharge of oily wastewater has become increasingly serious, threatening human health and safety seriously. In recent years, membrane separation technologies have been widely applied in various water treatment fields. In wastewater treatment, membrane separation technology has a promising prospect of application for its features, including high separation efficiency, high purity of separated products and low operation cost, Therefore, in the process of wastewater treatment, it will be of great importance for directly selective separation and recycling of oil products using the high selectivity of membrane separation technology.

Among various oily treatment methods, using oil adsorbents is the common one. In view of the defects of traditional oil adsorbents, such as low oil absorption, poor oil-water selectivity and poor oil preservation after oil absorption, researchers have researched and developed oil absorption resin and related products. Ayman M. Atta et al. successfully prepared granular high-oil-absorption resin by using ethylene glycol dimethacrylate (EGDMA) as a cross-linking agent (Journal of Applied Polymer Science, 2005, Volume 97, Page 80-91). A patent CN1884322A discloses a preparation method for a recyclable acrylics high-oil-absorption material. Xiao Ma et al. prepared a kind of methacrylate absorptive functional fiber with three-dimensional cross-linked network structure using a reactive extrusion and melt spinning method (Journal of Functional Materials, 2013, Issue 2, Page 177-181, Research on property of absorptive functional fiber based on polymethacrylate prepared via reactive extrusion and melt-spinning). Although the traditional oil adsorbents can achieve the purpose of oil-water separation, they have obvious defects, for example, these oil adsorbents are required to be replaced or regenerated after reaching saturated absorption for next adsorption. It not only lowers service efficiency and enhances treatment cost, but also can't meet the demands of continuous, quick and efficient treatment of oily wastewater.

Graphene is a kind of novel two-dimensional carbon material with large specific area, high hydrophobicity, etc. By exploiting these characters, researchers have developed various graphene-based oil adsorbents. D Zha et al. prepared a super-hydrophobic and oleophilic PVDF/graphene porous material by using a diffusion and freeze-drying method (Carbon, 2011, Volume 49, Page 5,166-5,172, Super-hydrophobic polyvinylidene fluoride/graphene porous material). D D Nguyen et al. prepared graphene-based sponge with high adsorption capacity and oil-water selectivity by a dip-coating method (Energy & Environmental Science, 2012, Volume 5, Page 7,908-7,912, Preparation of super-hydrophobic and super-oleophilic graphene-based sponge by simple dip-coating). Z Niu et al. prepared reduced graphene oxide foams by using a method similar to "fermentation", and its maximum absorption capacity of engine oil can reach 37 times the weight of itself (Advanced Materials, 2012, Volume 24, Page 4,144-4,150, Preparation of redox graphene-based foam by fermentation). Though the graphene-based oil adsorbents have remarkable oil absorption capacity, they work intermittently, still cannot meet the demands of continuous and efficient oil-water separation, limiting its promotion and application.

The membrane separation technology with high separation efficiency, low energy consumption and small area occupied, and has a huge development potential in the treatment of oily wastewater. At present, hydrophilic-oleophobic membranes are usually used for the treatment of oil wastewater. By the effect of a certain driving force, water penetrates the membrane, while oil is blocked outside the membrane, thus achieving the purpose of oil-water separation (CN103601826A, and Industrial & Engineering Chemistry Research (2014, Volume 53, Page 6401-6408, Surface hydrophilicity of hydrophilic modified polyvinylidene fluoride membrane prepared by non-solvent phase conversion, and effects thereof on oil/water separation)). It has a water flux of 90 L/($m^2 \cdot h \cdot bar$) in the treatment of kerosene-water mixture, but shows high processing cost, poor oil pollution resistance, and the membrane pores are easily blocked. In the case of treating oily wastewater with relatively few oil contents, the hydrophilic-oleophobic membranes must afford high water pressure to drive water to penetrate, thus requiring large membrane areas and high energy consumption. For treating the same oily wastewater of the hydrophobic-oleophilic membranes, through oil and intercept water may be more economical. However, the hydrophobic-oleophilic membranes reported have some drawbacks including high preparing cost, complicated process, difficult to large-scale production, consistently reduced hydrophobicity and low mechanical strength.

SUMMARY OF THE PRESENT INVENTION

To solve the above technical problems, the present invention provides a hydrophobic-oleophilic hollow fiber composite membrane and preparing method thereof. The hydrophobic-oleophilic hollow fiber composite membrane prepared has high strength, persistent and stable hydrophobicity. It can be used for continuous oil-water separation by taking advantage of the special properties of the hollow fiber membrane. The preparing method is simple, easily operable, and suitable for industrial production.

Accordingly, the technical solution of the present invention is as follows:

A hydrophobic-oleophilic hollow fiber composite membrane consists of hollow tubular braids and surface separation layers coated on the outer surfaces of the hollow tubular braids, wherein the hollow tubular braids have an outer diameter of 0.8~1.9 mm; wherein the surface separation layers have a thickness of 0.1~0.6 mm; wherein membrane-forming polymers in the surface separation layers are polyvinylidene fluoride, and all other components are hydrophobic ingredients, including graphene.

A preparing method of hydrophobic-oleophilic hollow fiber composite membrane comprises the following steps of:

1) Preparation of the reinforcements: preparing hollow tubular braids by two-dimensional braided technique using polyester filaments, wherein the hollow tubular braids are used as the reinforcements of the hydrophobic-oleophilic hollow fiber composite membrane; preferably, wherein the outer diameter of the hollow tubular braids tubes is 1~2 mm.

2) Preparation of the casting solution of surface separation layer: preparing a casting membrane solution of surface separation layer, wherein the mass of the casting solutions are as following:

polyvinylidene fluoride 8~20%,
pore-forming agent 0~15%,
graphene 0.1~1.5%, and the rest of solvent;

wherein the pore-forming agent is a mixture of organic particles and hydrophobic additive, preferably, wherein the organic particles are hydrophobic silicon dioxide or hydrophobic titanium dioxide; wherein hydrophobic additive is any one of dioctyl phthalate, dibutyl phthalate, dinonyl phthalate, methyl methacrylate and butyl methacrylate;

wherein solvent is a good solvent of polyvinylidene fluoride; good solvent is the solvent which has a strong ability of dissolving polymer and the solute interaction parameter between polymer and solvent is less than 0.5;

3) pretreatment process of the reinforcements: the reinforcements prepared in step 1) are washed with 1~5 wt. % sodium hydroxide aqueous solution for 2 h at 60~100° C.; then the products are washed with distilled water to remove residual sodium hydroxide rand dried to a constant weight, and the processed reinforcements are obtained;

4) once coating: uniformly coating the casting solution of surface separation layer obtained in step 2) on the outer surface of the processed reinforcements through a spinning spinneret to form a primary membrane; towing the primary membrane with a filament guide roller, and passing through an air gap and immersing into a water coagulation bath; then the formed products are kept in water for 4~10 h and stored in ethanol for 12~24 h in turn to obtain the first coating membrane; preferably, wherein the air gap with a length of 10~30 cm, and the coagulation bath with a temperature of 20~60° C. and a concentration of 0~10 wt. % of good solvent;

5) twice coating to prepare a hydrophobic-oleophilic hollow fiber composite membrane: removing the liquid attached on the surface of the first coating membrane, and uniformly coating the casting solution of surface separation layer obtained in step 2) on the outer surface of the first coating membrane through a spinning spinneret to form a second coating membrane; towing the second coating membrane with a filament guide roller, and passing through an air gap and immersing into a water coagulation bath; then the formed products are kept in water for 4~10 h and stored in ethanol for 12~24 h in turn to obtain the hydrophobic-oleophilic hollow fiber composite membrane.

Preferably, step 6) is also comprised of: the hydrophobic-oleophilic hollow fiber composite membrane obtained in step 5) is used to replace the first coating membrane in step 5), and the coating operation of step 5) is repeated 1~3 times; the coating operation is repeated multiple times to prepare a hydrophobic-oleophilic hollow fiber composite membrane.

Wherein the good solvent of polyvinylidene fluoride is N, N-dimethylformamide, N, N-dimethylacetamide, dimethyl sulfoxide or N-methyl pyrrolidone.

Preferably, the winding speed of guide the filament guide roller in step 4) is 30~150 cm/min.

Preferably, the mixing method for preparing casting solution of surface separation layer in step 2) comprises steps of: mixing and ultrasonically processing hydrophobic additive and graphene, ultrasonically mixing the mixed materials, then adding polyvinylidene fluoride and organic solvents into the above mixtures, uniformly mixing.

The hydrophobic-oleophilic hollow fiber composite membrane prepared in the present invention has persistent and stable hydrophobicity, a breaking strength of over 130 MPa. It can be used for continuous oil-water separation for the special shape of the hollow fiber membrane, showing a high separation efficiency and the oil is recycled easily. It also can be processed into the products of various forms and purposes, widening the application scope. The preparing method is simple, low cost, showing a huge application prospect.

DETAILED DESCRIPTION OF THE EMBODIMENT

Referring to embodiments, the present invention is further illustrated in detail.

Embodiment 1

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N,N-dimethylacetamide of 72.7 wt. % (wherein the mass fraction is in terms of the total mass of the casting solution), dibutyl phthalate of 8 wt. % and graphene of 0.3 wt. % for 4 h; then, polyvinylidene fluoride of 15 wt. % and hydrophobic silica dioxide (40 nm particle size) of 4 wt. % are added into the above mixtures, and vigorous stirring in a flask at 50° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 2 wt. % sodium hydroxide aqueous solution for 2 h at a temperature of 90° C.; then the products are washed with distilled water to remove residual sodium hydroxide and dried to a constant weight, and the processed reinforcements are obtained 4) Once coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 70 cm/min), passing through an air gap with a length of 20 cm and immersing into a water coagulation bath at 20° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice, and the hydrophobic-oleophilic hollow fiber composite membrane is obtained.

In the present invention, an electronic universal material machine is used to determine the breaking strength of the hydrophobic-oleophilic hollow fiber composite membrane, wherein the holding distance is 5 cm and the extension rate is 20 mm/min.

In the present invention, the water entry pressure of the hydrophobic-oleophilic hollow fiber composite membrane is measured using a laboratory-scale microfiltration setup. The pressure imposed on the membrane gradually increases until the first water droplet dripped (initial pressure=0.01 MPa, step size=0.01 MPa), recording the pressure at this time, which is the water entry pressure of the hydrophobic-oleophilic and hollow fiber composite membrane. Each pressure is continuously tested for 30 min, and five measurements are carried out to obtain the average value.

In the present invention, the oil-water separation performance of the hydrophobic-oleophilic hollow fiber composite membrane is tested by a negative pressure dead-end filtration experiment. The hydrophobic-oleophilic hollow fiber composite membrane module is placed at the oil-water interface and the test lasts for 8 h with a pressure of −0.1 MPa. The oil flux is calculated by following equation (1):

$$J=V/(A*t) \quad (1)$$

Where J is the oil flux (L/(m²·1)), V is the oils flow volume of permeation (L), A is the effective area of membrane (m²), and t is the filtration time (h). After each test, the membrane is rinsed and cleaned using ethanol, dried for the next test.

The recovery rate of the oil flux is calculated by following equation (2):

$$\varepsilon = J_2/J_1 \quad (2)$$

Where $J_1$ is the oil flux at the moment of 1 h in the first test, $J_2$ is the oil flux at the moment of 1 h in the second test after the membrane is washed using alcohol.

In the present invention, the oil-water separation performance of the hydrophobic-oleophilic hollow fiber composite membrane is continuously tested for 72 h according to the above testing method of the oil-water separation performance, and it is washed using alcohol. Then, the water entry pressure of the hydrophobic-oleophilic hollow fiber composite membrane washed by alcohol is measured (according to the above test method of water entry pressure). The water entry pressure is used to evaluate the hydrophobic stability of the hydrophobic-oleophilic hollow fiber composite membrane.

The hydrophobic-oleophilic and hollow fiber composite membrane prepared in this embodiment shows a breaking strength of 153.6 MPa; a water entry pressure of 0.44 MPa; an oil flux of 42.5 L/(m²·h) in the kerosene-water mixture separation test at the pressure of −0.1 MPa; an oil flux recovery rate of 98.6%; a water entry pressure of 0.44 MPa after continuously testing the oil-water separation performance for 72 h.

Embodiment 2

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N,N-dimethylacetamide of 70.5 wt. % (wherein the mass fraction is in terms of the total mass of the casting solution), dioctyl phthalate of 8 wt. % and graphene of 0.5 wt. % for 4 h; then, polyvinylidene fluoride of 17 wt. % and hydrophobic titanium dioxide (100 nm particle size) of 4 wt. % are added into the above mixtures, and vigorous stirring in a flask at 60° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 5 wt. % sodium hydroxide aqueous solution for 2 h at a temperature of 70° C.; then the products are washed with distilled water to remove residual sodium hydroxide and dried to a constant weight, and the processed reinforcements are obtained 4) Frist coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 45 cm/min), passing through an air gap with a length of 20 cm and immersing into a coagulation bath with a temperature of 30° C. and a concentration of 5 wt. % of N, N-dimethylacetamide; then the formed products are kept in water for at least 8 h and stored in ethanol for at least 24 h in turn to obtain the first coating membrane.

5) Preparation of the hydrophobic-oleophilic hollow fiber composite membrane second coating: removing the liquid attached on the surface of the first coating membrane, replacing the processed reinforcements in step 4) with the dried first coating membrane, repeating step 4), and the hydrophobic-oleophilic hollow fiber composite membrane is obtained.

According to the test method in embodiment 1, the hydrophobic-oleophilic and hollow fiber composite membrane prepared in this embodiment shows a breaking strength of 154.1 MPa; a water entry pressure of 0.41 MPa; an oil flux of 40.3 L/(m²·h) in the kerosene-water mixture separation test at the pressure of −0.1 MPa; an oil flux recovery rate of 98.2%; a water entry pressure of 0.41 MPa after continuously testing the oil-water separation performance for 72 h.

Embodiment 3

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N,N-dimethylformamide of 71.8 wt. % (wherein the mass fraction is in terms of the total mass of the casting solution), butyl methacrylate of 6 wt. % and graphene of 1.2 wt. % for 4 h; then, polyvinylidene fluoride of 18 wt. % and hydrophobic silicon dioxide (40 nm particle size) of 3 wt. % are added into the above mixtures, and vigorous stirring in a flask at 60° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 2 wt. % sodium hydroxide aqueous solution for 2 h at a temperature of 90° C.; then the products are washed with distilled water to remove residual sodium hydroxide and dried to a constant weight, and the processed reinforcements are obtained 4) Once coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 40 cm/min), passing through an air gap with a length of 20 cm and immersing into a coagulation bath with a temperature of 30° C. and a concentration of 5 wt. % of N, N-dimethylformamide; then the formed products are kept in water for at least 8 h and stored in ethanol for at least 24 h in turn to obtain the first coating membrane.

5) Preparation of the hydrophobic-oleophilic hollow fiber composite membrane by twice coating: removing the liquid attached on the surface of the first coating membrane, replacing the processed reinforcements in step 4) with the dried first coating membrane, repeating step 4), and the hydrophobic-oleophilic hollow fiber composite membrane is obtained.

According to the test method in embodiment 1, the hydrophobic-oleophilic and hollow fiber composite membrane prepared in this embodiment shows a breaking strength of 153.6 MPa; a water entry pressure of 0.42 MPa; an oil flux of 41.6 L/(m²·h) in the kerosene-water mixture separation test at the pressure of −0.1 MPa; an oil flux recovery rate of 98.3%; a water entry pressure of 0.42 MPa after continuously testing the oil-water separation performance for 72 h.

Embodiment 4

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N, N-dimethylacetamide of 76.3 wt. % (wherein the mass fraction is in terms of the total mass of the casting solution), dinonyl phthalate of 8 wt. % and graphene of 0.7 wt. % for 4 h; then, polyvinylidene fluoride of 18 wt. % and hydrophobic titanium dioxide (100 nm particle size) of 5 wt. % are added into the above mixtures, and vigorous stirring in a flask at 50° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 3 wt. % sodium hydroxide aqueous solution for 2 h at a temperature of 80° C.; then the products are washed with distilled water to remove residual sodium hydroxide and dried to a constant weight, and the processed reinforcements are obtained 4) Frist coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 120 cm/min), passing through an air gap with a length of 15 cm and immersing into a water coagulation bath at 40° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice, and the hydrophobic-oleophilic hollow fiber composite membrane is obtained.

According to the test method in embodiment 1, the hydrophobic-oleophilic and hollow fiber composite membrane prepared in this embodiment shows a breaking strength of 151.3 MPa; a water entry pressure of 0.43 MPa; an oil flux of 63.6 L/(m²·h) in the kerosene-water mixture separation test at the pressure of −0.1 MPa; an oil flux recovery rate of 98.7%; a water entry pressure of 0.43 MPa after continuously testing the oil-water separation performance for 72 h.

Embodiment 5

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N, N-dimethylacetamide of 72.5 wt. % (wherein the mass fraction is in terms of the total mass of the casting solution), dibutyl phthalate of 10 wt. % and graphene of 0.5 wt. % for 4 h; then, polyvinylidene fluoride of 18 wt. % and hydrophobic silicon dioxide (40 nm particle size) of 3 wt. % are added into the above mixtures, and vigorous stirring in a flask at 60° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 2 wt. % sodium hydroxide aqueous solution for 2 h at a temperature of 90° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 100 cm/min), passing through an air gap with a length of 12 cm and immersing into a water coagulation bath at 40° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice, and the hydrophobic-oleophilic hollow fiber composite membrane is obtained.

According to the test method in embodiment 1, the hydrophobic-oleophilic and hollow fiber composite membrane prepared in this embodiment shows a breaking strength of 149.1 MPa; a water entry pressure of 0.40 MPa; an oil flux of 589.6 L/(m²·h) in the kerosene-water mixture separation test at the pressure of −0.1 MPa; an oil flux recovery rate of 98.8%; a water entry pressure of 0.39 MPa after continuously testing the oil-water separation performance for 72 h.

Embodiment 6

1) Preparation of the reinforcements: hollow tubular braids are prepared by two-dimensional braided technique using polyester filaments with a diameter of 1.8 mm; the hollow tubular braids are used as the reinforcements of the hydrophobic-oleophilic hollow fiber composite membrane, with a breaking strength of 153.2 MPa.

2) Preparation of casting solution of surface separation layer: mixing and ultrasonically processing dimethyl sulfoxide of 72.7 wt. % (wherein the mass fraction is in terms of the total mass of the casting solution), dibutyl phthalate of 8 wt. % and graphene of 0.3 wt. % for 4 h; then, polyvinylidene fluoride of 15 wt. % and hydrophobic titanium dioxide (100 nm particle size) of 4 wt. % are added into the above mixtures, and vigorous stirring in a flask at 70° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 3 wt. % sodium hydroxide aqueous solution for 2 h at a temperature of 80° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 70 cm/min), passing through an air gap with a length of 20 cm and immersing into a water coagulation bath at 50° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice, and the hydrophobic-oleophilic hollow fiber composite membrane is obtained.

According to the test method in embodiment 1, the hydrophobic-oleophilic and hollow fiber composite membrane prepared in this embodiment shows a breaking strength of 147.3 MPa; a water entry pressure of 0.38 MPa; an oil flux of 47.3 L/(m²·h) in the kerosene-water mixture separation test at the pressure of −0.1 MPa; an oil flux recovery rate of 98.1%; a water entry pressure of 0.38 MPa after continuously testing the oil-water separation performance for 72 h.

Embodiment 7

1) Preparation of the reinforcements: hollow tubular braids are prepared by two-dimensional braided technique using polyester filaments with a diameter of 1.5 mm; the hollow tubular braids are used as the reinforcements of the hydrophobic-oleophilic hollow fiber composite membrane, with a breaking strength of 149.1 MPa.

2) Preparation of casting solution of surface separation layer: mixing and ultrasonically processing N, N-dimethylformamide of 72.7 wt. % (wherein the mass fraction is in terms of the total mass of the casting solution), dibutyl phthalate of 8 wt. % and graphene of 0.7 wt. % for 4 h; then, polyvinylidene fluoride of 15 wt. % and hydrophobic silicon dioxide (40 nm particle size) of 4 wt. % are added into the above mixtures, and vigorous stirring in a flask at 50° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 2 wt. % sodium hydroxide aqueous solution for 2 h at a temperature of 90° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 70 cm/min), passing through an air gap with a length of 20 cm and immersing into a water coagulation bath at 20° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice and the hydrophobic-oleophilic hollow fiber composite membrane is obtained.

According to the test method in embodiment 1, the hydrophobic-oleophilic and hollow fiber composite membrane prepared in this embodiment shows a breaking strength of 145.3 MPa; a water entry pressure of 0.38 MPa; an oil flux of 48.1 L/(m²·h) in the kerosene-water mixture separation test at the pressure of −0.1 MPa; an oil flux recovery rate of 97.5%; a water entry pressure of 0.36 MPa after continuously testing the oil-water separation performance for 72 h.

Embodiment 8

1) Preparation of the reinforcements: hollow tubular braids are prepared by two-dimensional braided technique using polyester filaments with a diameter of 1.2 mm; the hollow tubular braids are used as the reinforcements of the hydrophobic-oleophilic hollow fiber composite membrane, with a breaking strength of 135.6 MPa.

2) Preparation of casting solution of surface separation layer: mixing and ultrasonically processing N, N-dimethylacetamide of 73.5 wt. % (wherein the mass fraction is in terms of the total mass of the casting solution), dibutyl phthalate of 6 wt. % and graphene of 0.5 wt. % for 4 h; then, polyvinylidene fluoride of 17 wt. % and hydrophobic silicon dioxide (40 nm particle size) of 3 wt. % are added into the above mixtures, and vigorous stirring in a flask at 60° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 5 wt. % sodium hydroxide aqueous solution for 2 h at a temperature of 70° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 45 cm/min), passing through an air gap with a length of 15 cm and immersing into a coagulation bath with a temperature of 30° C. and a concentration of 5 wt. % of N, N-dimethylacetamide; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) twice, and the hydrophobic-oleophilic hollow fiber composite membrane is obtained.

According to the test method in embodiment 1, the hydrophobic-oleophilic and hollow fiber composite membrane prepared in this embodiment shows a breaking strength of 131.3 MPa; a water entry pressure of 0.36 MPa; an oil flux of 39.7 L/(m$^2$·h) in the kerosene-water mixture separation test at the pressure of −0.1 MPa; an oil flux recovery rate of 98.5%; a water entry pressure of 0.36 MPa after continuously testing the oil-water separation performance for 72 h.

Embodiment 9

1) Preparation of the reinforcements: hollow tubular braids are prepared by two-dimensional braided technique using polyester filaments with a diameter of 2 mm; the hollow tubular braids are used as the reinforcements of the hydrophobic-oleophilic hollow fiber composite membrane, with a breaking strength of 158.3 MPa.

2) Preparation of casting solution of surface separation layer: mixing and ultrasonically processing N, N-dimethylacetamide of 77.7 wt. % (wherein the mass fraction is in terms of the total mass of the casting solution), dinonyl phthalate of 10 wt. % and graphene of 0.3 wt. % for 4 h; then, polyvinylidene fluoride of 10 wt. % and hydrophobic silicon dioxide (40 nm particle size) of 4 wt. % are added into the above mixtures, and vigorous stirring in a flask at 50° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 3 wt. % sodium hydroxide aqueous solution for 2 h at a temperature of 80° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 120 cm/min), passing through an air gap with a length of 15 cm and immersing into a coagulation bath with a temperature of 40° C. and a concentration of 8 wt. % of N, N-dimethylacetamide; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) three times, and the hydrophobic-oleophilic hollow fiber composite membrane is obtained.

According to the test method in embodiment 1, the hydrophobic-oleophilic and hollow fiber composite membrane prepared in this embodiment shows a breaking strength of 148.4 MPa; a water entry pressure of 0.41 MPa; an oil flux of 65.3 L/(m$^2$·h) in the kerosene-water mixture separation test at the pressure of −0.1 MPa; an oil flux recovery rate of 99.1%; a water entry pressure of 0.41 MPa after continuously testing the oil-water separation performance for 72 h.

Embodiment 10

1) Preparation of the reinforcements: hollow tubular braids are prepared by two-dimensional braided technique using polyester filaments with a diameter of 1.8 mm; the hollow tubular braids are used as the reinforcements of the hydrophobic-oleophilic hollow fiber composite membrane, with a breaking strength of 153.2 MPa.

2) Preparation of casting solution of surface separation layer: mixing and ultrasonically processing N, N-dimethylformamide of 73.5 wt. % (wherein the mass fraction is in terms of the total mass of the casting solution), methyl methacrylate of 8 wt. % and graphene of 0.5 wt. % for 4 h; then, polyvinylidene fluoride of 12 wt. % and hydrophobic titanium dioxide (100 nm particle size) of 6 wt. % are added into the above mixtures, and vigorous stirring in a flask at 60° C. for 4 h to a homogeneous solution; then, the homogeneous solution is deaerated in a vacuum oven for obtaining the casting solution of surface separation layer.

3) Pretreatment process of the reinforcements: the reinforcements prepared in step 1) are washed with 2 wt. % sodium hydroxide aqueous solution for 2 h at a temperature of 90° C.; then the products are washed with distilled water to remove residual sodium hydroxide and dried to a constant weight, and the processed reinforcements are obtained 4) First coating: the casting solution of surface separation layer obtained in step 2) is uniformly coated on the outer surface of the processed reinforcements through a spinning spinneret to form a primary membrane; the primary membrane is towed with a filament guide roller (wherein a traction speed is 40 cm/min), passing through an air gap with a length of 12 cm and immersing into a water coagulation bath at 40° C.; then the formed products are kept in water for at least 8 h and stored in ethanol for at least 24 h in turn to obtain the first coating membrane.

5) Preparation of the hydrophobic-oleophilic hollow fiber composite membrane by multiple coating: removing the liquid attached on the surface of the first coating membrane, replacing the processed reinforcements in step 4) with the dried first coating membrane, repeating step 4) four times, and the hydrophobic-oleophilic hollow fiber composite membrane is obtained.

According to the test method in embodiment 1, the hydrophobic-oleophilic and hollow fiber composite membrane prepared in this embodiment shows a breaking strength of 145.1 MPa; a water entry pressure of 0.42 MPa; an oil flux of 59.3 L/(m$^2$·h) in the kerosene-water mixture separation test at the pressure of −0.1 MPa; an oil flux recovery rate of 97.9%; a water entry pressure of 0.41 MPa after continuously testing the oil-water separation performance for 72 h.

The invention claimed is:

1. A method for preparing the hydrophobic-oleophilic hollow fiber composite membrane, comprises the following steps of:
   1) preparing hollow tubular braids by two-dimensional braided technique using polyester filaments, wherein the hollow tubular braids are used as the reinforcements of the hydrophobic-oleophilic hollow fiber composite membrane;
   2) preparing a casting membrane solution of surface separation layer, wherein the mass of the casting solutions are as following:

polyvinylidene fluoride 8~20%,
pore-forming agent 0~15%,
graphene 0.1~1.5%, and the rest of solvent;
wherein the pore-forming agent is a mixture of organic particles and hydrophobic additive, wherein the organic particles are hydrophobic silicon dioxide or hydrophobic titanium dioxide; wherein hydrophobic additive is any one of dioctyl phthalate, dibutyl phthalate, dinonyl phthalate, methyl methacrylate and butyl methacrylate;
wherein the solvent is a good solvent of polyvinylidene fluoride;

3) washing the reinforcements prepared in step 1) using sodium hydroxide aqueous solution with a concentration of 1~5 wt. % for 2 h at a temperature of 60~100° C.; then washing the products with distilled water to remove residual sodium hydroxide and dried to a constant weight, and the processed reinforcements are obtained;

4) uniformly coating the casting solution of surface separation layer obtained in step 2) on the outer surface of the processed reinforcements through a spinning spinneret to form a primary membrane; towing the primary membrane with a filament guide roller, and passing through an air gap and immersing into a water coagulation bath; then the formed products are kept in water for 4~10 h and stored in ethanol for 12~24 h in turn to obtain the first coating membrane;

5) removing the liquid attached on the surface of the first coating membrane, and uniformly coating the casting solution of surface separation layer obtained in step 2) on the outer surface of the first coating membrane through a spinning spinneret to form a second coating membrane; towing the second coating membrane with a filament guide roller, and passing through an air gap and immersing into a water coagulation bath; then the formed products are kept in water for 4~10 h and stored in ethanol for 12~24 h in turn to obtain the hydrophobic-oleophilic hollow fiber composite membrane.

2. The preparing method for the hydrophobic-oleophilic hollow fiber composite membrane, according to claim 1, wherein the mass ratio of the organic particles to the hydrophobic additive is 1:1~6.

3. The preparing method for the hydrophobic-oleophilic hollow fiber composite membrane, according to claim 1, wherein the air gap has a length of 10~30 cm, the coagulation bath has a temperature of 20~60° C. and a concentration of 0~10 wt. % of a solvent of polyvinylidene fluoride.

4. The preparing method for the hydrophobic-oleophilic hollow fiber composite membrane, according to claim 1, wherein the solvent of polyvinylidene fluoride is N, N-dimethylformamide, N, N-dimethylacetamide, dimethyl sulfoxide or N-methyl pyrrolidone.

5. The preparing method for the hydrophobic-oleophilic hollow fiber composite membrane, according to claim 1, wherein the outer diameter of the hollow tubular braids tubes in step 1) is 1~2 mm.

6. The preparing method for the hydrophobic-oleophilic hollow fiber composite membrane according to claim 1, wherein the winding speed of guide the filament guide roller in step 4) is 30~150 cm/min.

7. The preparing method for the hydrophobic-oleophilic hollow fiber composite membrane, according to claim 1, wherein the mixing method for preparing casting solution of surface separation layer in step 2) comprises steps of: mixing and ultrasonically processing hydrophobic additive and graphene, ultrasonically mixing the mixed materials, then adding polyvinylidene fluoride and organic solvents into the above mixtures, uniformly mixing.

8. The preparing method for the hydrophobic-oleophilic hollow fiber composite membrane, according to claim 3, wherein the solvent of polyvinylidene fluoride is N, N-dimethylformamide, N, N-dimethylacetamide, dimethyl sulfoxide or N-methyl pyrrolidone.

* * * * *